M. SCHNAPP.
Seeding-Machines.

No. 145,019.

Patented Nov. 25, 1873.

Witnesses
John A. Ellis.
Wm K. Ellis

Inventor
Morriss Schnapp
Per
J. N. Alexander & Co
Atty's

UNITED STATES PATENT OFFICE.

MORRISS SCHNAPP, OF PLEASANT PARK, MISSOURI.

IMPROVEMENT IN SEEDING-MACHINES.

Specification forming part of Letters Patent No. 145,019, dated November 25, 1873; application filed March 15, 1873.

*To all whom it may concern:*

Be it known that I, MORRISS SCHNAPP, of Pleasant Park, in the county of Carroll and State of Missouri, have invented certain new and useful Improvements in Seeders and Cultivators; and I do hereby declare that the following is a full, clear, and exact description thereof, reference being had to the accompanying drawings and to the letters of reference marked thereon, which form a part of this specification.

The nature of my invention consists in the construction and arrangement of a grain-drill, as will be hereinafter more specifically set forth and claimed.

In order to enable others skilled in the art to which my invention appertains to make and use the same, I will now proceed to describe its construction and operation, referring to the annexed drawing, in which—

Figure 1:
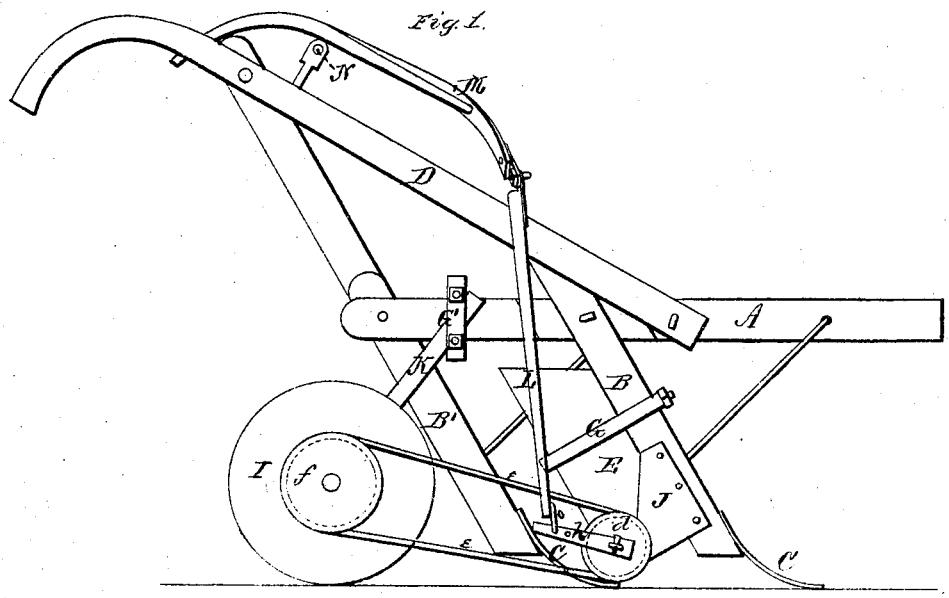
Figure 2:
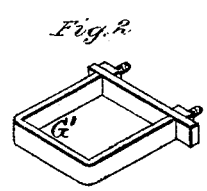
Figure 3:
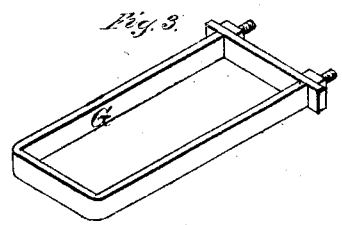
Figure 4:
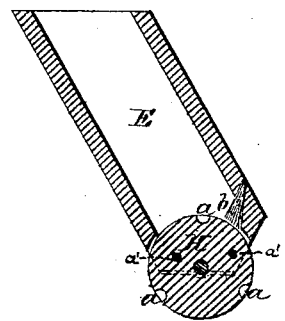

Figure 1 is a side view of my entire machine. Figs. 2 and 3 show clamps used in the machine, and Fig. 4 is a vertical section of the seed-box.

A represents the plow-beam; B and B', plow-standards, with plows or shovels C C; and D D, the handles of a cultivator, constructed in any of the known and usual ways. E represents the seed-box, constructed in the form shown in Fig. 4, and attached to the rear side of the front plow-standard B by means of a rectangular clamp, G. (Shown in Fig. 3.) In the lower end of the box E is placed the wheel H, having cups $a$ $a$ formed at equal distances apart in the circumference. These cups may be provided with set-screws or other suitable devices to regulate their size, so as to drop more or less seed, as required. In front of the wheel H, in the box E, is a brush, $b$, to prevent any more seed than what is contained in the cups $a$ to pass out as the wheel revolves. On the outer end of the shaft upon which the wheel H is secured is attached a pulley, $d$, around which passes an endless cord or belt, $e$, connecting it with a pulley, $f$, attached on the same shaft as a large covering-wheel, I, located in rear of the seed-box, and running in the furrow made by the front plow or shovel C. The circumference of this wheel is made concave, so as to cover the seed; and, as it revolves, the seed-wheel H is revolved by the cord or belt $e$, dropping the seed at regular intervals, or in drills, as desired, as the wheel H revolves when actuated by the band $e$, so that, by increasing the number of cavities $a$, a continuous flow of seed may be obtained when planting in drills. On each side of the front plow-standard B is attached a clod-fender, J, which extends toward the rear, one on each side of the seed-wheel H. The covering-wheel I is mounted upon a shaft or spindle, which is attached to or forms a part of a bar, K, and said bar is secured to the plow-beam A by means of a clamp, G'. (Shown in Fig. 2.) This clamp allows of the movement of the wheel I in every direction, up or down, according to the depth of the furrow, and back or forth, to regulate the tension of the cord or belt $e$, as may be required.

Having thus fully described my invention, what I claim as new, and desire to secure by Letters Patent, is—

The standards B B', clod-fenders J J, seed-box E, clamps G G', wheels H I, bar K, pulley $f$, and belt $e$, all constructed, combined, and arranged as and for the purpose set forth.

In testimony that I claim the foregoing as my own I affix my signature in presence of two witnesses.

MORRISS SCHNAPP.

Witnesses:
G. E. HOLLAND,
JULIUS WOHMANN.